(12) United States Patent
Relyea et al.

(10) Patent No.: US 7,814,498 B2
(45) Date of Patent: Oct. 12, 2010

(54) LOADING APPLICATION RESOURCES

(75) Inventors: David P. Relyea, Bellevue, WA (US);
Lauren B. Lavoie, Seattle, WA (US);
Martha M. Rotter, Seattle, WA (US);
Sujal S. Parikh, Redmond, WA (US);
Eric W. Harding, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1139 days.

(21) Appl. No.: 11/479,951

(22) Filed: Jun. 30, 2006

(65) Prior Publication Data
US 2007/0256048 A1 Nov. 1, 2007

Related U.S. Application Data

(60) Provisional application No. 60/796,777, filed on May 1, 2006.

(51) Int. Cl.
*G06F 3/00* (2006.01)
*G06F 9/46* (2006.01)
*G06F 7/00* (2006.01)

(52) U.S. Cl. .................. 719/310; 718/104; 707/705

(58) Field of Classification Search .............. 719/328, 719/330, 310; 718/104; 707/105
See application file for complete search history.

(56) References Cited

U.S. PATENT DOCUMENTS

| | | | | |
|---|---|---|---|---|
| 5,210,874 | A | * | 5/1993 | Karger ................. 719/328 |
| 5,732,263 | A | * | 3/1998 | Havens et al. ................ 1/1 |
| 5,966,702 | A | | 10/1999 | Fresko |
| 6,028,279 | A | | 2/2000 | Suryan |
| 6,233,606 | B1 | | 5/2001 | Dujari |
| 6,275,829 | B1 | | 8/2001 | Angiulo |
| 6,549,773 | B1 | | 4/2003 | Linden |
| 6,584,612 | B1 | | 6/2003 | Mueller |
| 6,591,260 | B1 | | 7/2003 | Schwarzhoff |
| 6,944,658 | B1 | | 9/2005 | Schneider |
| 6,944,846 | B2 | | 9/2005 | Ryzhov |

(Continued)

FOREIGN PATENT DOCUMENTS

WO    WO9522104    3/2006

OTHER PUBLICATIONS

Joann J. Ordille, Database Challenges in Global Information systems, 1993.*

(Continued)

*Primary Examiner*—Lechi Truong
(74) *Attorney, Agent, or Firm*—Workman Nydegger

(57) ABSTRACT

Described is a technology by which application-related resources are differentiated from other types of resources via a uniform resource identifier (URI) associated with each resource. Application-related resources may include a resource embedded in the application program, at least one content file associated with (e.g., distributed with) the application program, or a resource located on a site from which the application program was deployed. Because of the URI, a creating/loading mechanism may be called using substantially similar calling code to that which is used to call the mechanism for loading another type of resource, thereby providing a consistent programming model. In one example, the URI includes a packaging scheme and authority, or a relative path which may be converted to an absolute URI. The mechanism creates an object corresponding to the application-related resource, and loads the resource or a stream of a compound resource.

7 Claims, 5 Drawing Sheets

U.S. PATENT DOCUMENTS

| | | | |
|---|---|---|---|
| 7,010,568 B1 | 3/2006 | Schneider | |
| 7,010,580 B1 | 3/2006 | Fu | |
| 7,020,874 B2 | 3/2006 | Sokolov | |
| 7,346,863 B1 * | 3/2008 | Pritchard et al. | 716/2 |
| 7,437,367 B2 * | 10/2008 | Shur et al. | 1/1 |
| 2002/0016814 A1 * | 2/2002 | Convent et al. | 709/203 |
| 2002/0062320 A1 | 5/2002 | Shimojima | |
| 2002/0118231 A1 | 8/2002 | Smith et al. | |
| 2003/0023661 A1 | 1/2003 | Clohessy | |
| 2003/0112792 A1 | 6/2003 | Cranor | |
| 2003/0182305 A1 | 9/2003 | Balva | |
| 2003/0204529 A1 | 10/2003 | Herting | |
| 2004/0158602 A1 | 8/2004 | Broberg | |
| 2005/0044526 A1 | 2/2005 | Kooy | |
| 2005/0132266 A1 | 6/2005 | Ambrosino | |
| 2005/0162422 A1 * | 7/2005 | Miyata | 345/440 |
| 2005/0188203 A1 | 8/2005 | Bhaskaran | |
| 2006/0064699 A1 | 3/2006 | Bonk | |

OTHER PUBLICATIONS

"RFC 2396-Uniform Resource Identifier (URI): Generic Syntax", Xerox Corporation, Aug. 1998, T. Berners-Lee et al.

Loading Resources: developer.apple.com/documentation/Cocoa/Conceptual/DisplayWebContent/Tasks/ResourceLoading.html.

Loading Resources With the GetResource( ) Method, .devx.com/tips/Tip/5697.

Loading Icons and Other Graphics into an Application Using a Resource Bundle, devx.com/getHelpOn/10MinuteSolution/20423.

* cited by examiner

LOADING APPLICATION RESOURCES

CROSS REFERENCE TO RELATED APPLICATION

The present invention claims priority to U.S. provisional patent application Ser. No. 60/796,777, filed May 1, 2006, which is hereby incorporated by reference.

BACKGROUND

Application programs deal with several different types of resources, for example images, fonts, pages to which the application may navigate, or files (e.g., XML-based) that are used as data sources within the application. These resources may be loaded from any of several possible locations.

At present, developers write custom mechanisms for retrieving resources from each of these locations. Further, developers often need to refer to an application resource by specifying a full path to that resource. This complicates programming models, and results in poor application portability.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a mechanism may differentiate application-related resources from other types of resources via a uniform resource identifier (URI) associated with each resource. Because of the URI, the mechanism may be called at an interface using substantially similar calling code to that which is used to call the mechanism for loading another type of resource. At least part of the resource may be loaded via the mechanism, e.g., an object representing the entire resource, or a stream of a compound document resource. In one example implementation, the URI identifies the application resource via a packaging scheme and authority or a relative path with an implicit packaging scheme and authority. Application-related resources may include a resource embedded in the application program, at least one content file associated with (e.g., distributed with) the application program, or a resource located on a site from which the application program was deployed.

By providing a mechanism that receives requests for application-related resources and other resources via a common interface and method, a resource may be identified by a parameter value that includes a scheme and an authority. A subcomponent of the mechanism may be selected based on the scheme, and invoked to load at least part of the application-related resource based on the authority. A resource part component may be used for loading when the application-related resource comprises a resource embedded in the application program; a content file part component may be used for loading when the application-related resource comprises at least one content file associated with the application program; or a site of origin file part component may be used for loading when the application-related resource comprises a resource located on a site from which the application program was deployed.

In one example, a mechanism operates by receiving a first call at an interface, in which the call identifies an application-related resource by using a packaging scheme or a relative path with an implicit packaging scheme. The mechanism creates an object corresponding to the application-related resource, and receives a second call at the interface to load a stream of the application-related resource. In the event that the first call identifies the application-related resource via a relative path, the mechanism or other entity may convert the relative path to an absolute uniform resource identifier.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
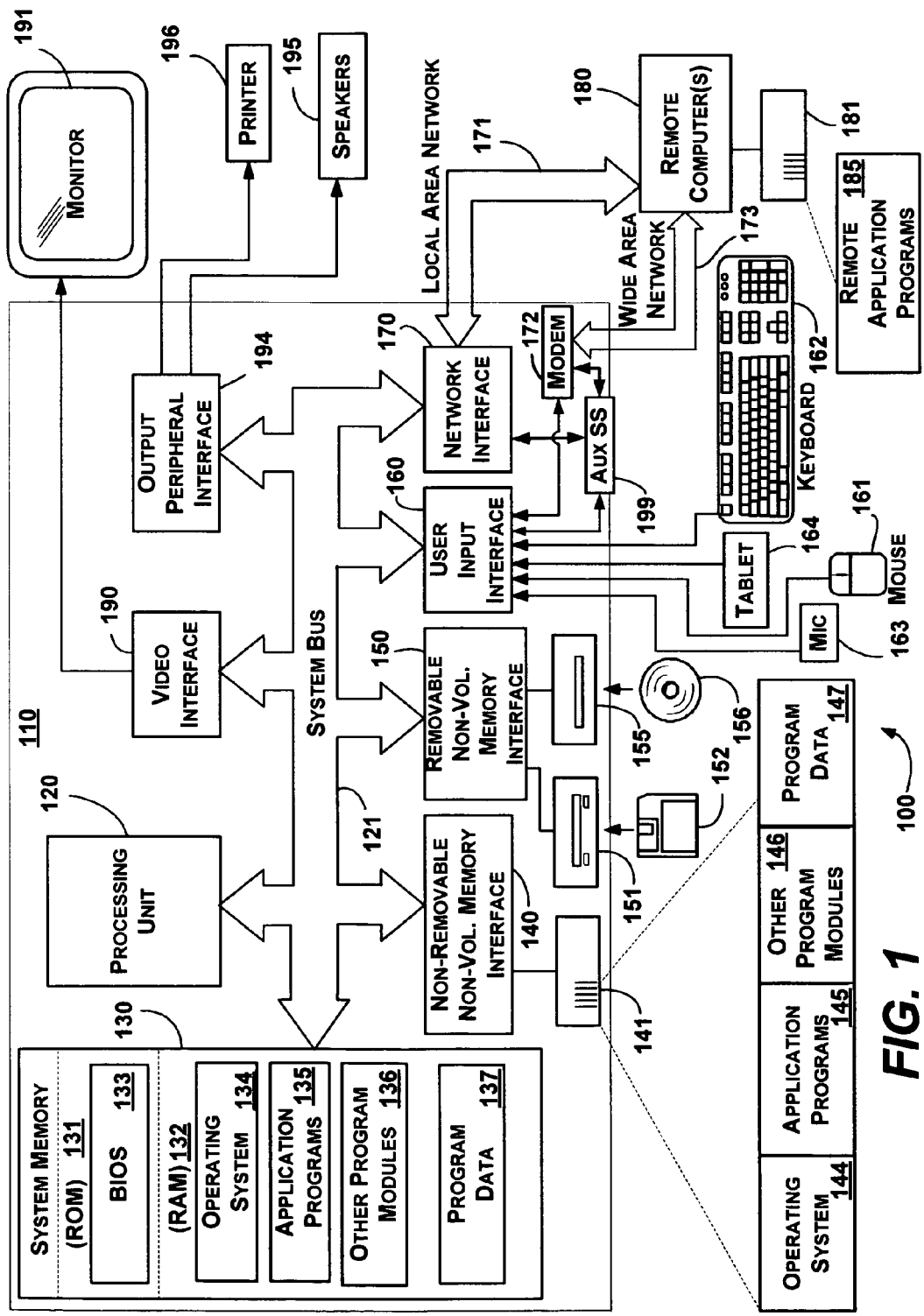
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include one ore more local area networks (LAN) 171 and one or more wide area networks (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. A wireless networking component 174 such as comprising an interface and antenna may be coupled through a suitable device such as an access point or peer computer to a WAN or LAN. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary subsystem 199 (e.g., for auxiliary display of content) may be connected via the user interface 160 to allow data such as program content, system status and event notifications to be provided to the user, even if the main portions of the computer system are in a low power state. The auxiliary subsystem 199 may be connected to the modem 172 and/or network interface 170 to allow communication between these systems while the main processing unit 120 is in a low power state.

Loading Application Resources

Various aspects of the technology described herein are generally directed towards centralized logic for retrieving resources for application programs (including other software programs such as operating system components, controls, and so forth) from among various locations, whereby developers need not write their own custom mechanisms for retrieving each. To obtain resources from each of these locations, a common programming model may be provided.

In one example implementation, one such programming model is based on Windows® Presentation Foundation (which works with the Microsoft NET Framework). Windows® Presentation Foundation generally provides a consistent programming model for building locally installed and/or web browser applications. In general, Windows® Presentation Foundation facilitates control, design, and development of various visual aspects of Windows® programs.

Windows® Presentation Foundation is able to obtain resources that are formatted in various ways, including using a scheme to obtain resources formatted according to an XML Paper Specification (XPS). XPS describes an XPS document format, a standard packaging format for containers. In general, a document in XPS Document format (XPS Document) is a paginated representation of electronic paper described in an XML-based format.

Aspects of the technology described herein use an example approach that leverages the Windows® Presentation Foundation and XPS packaging mechanisms. However, other examples and technologies may be employed. For example, as will be understood, an alternative "application://" URI scheme has been developed and may be used for retrieving resources for application programs.

Thus, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

In general, in an application program that leverages the Windows® Presentation Foundation, scenarios exist for loading resources from various locations. To this end, various schemes are provided that allow resource retrieval from sites, storage locations, and packages such as XPS packages. In one example implementation, a system including central APIs for obtaining resources derive from System.Net.WebRequest, which provides a familiar and well-understood programming model for developers. This system may be used by components within Windows® Presentation Foundation, (where a component may comprise a navigation framework, imaging, and so forth), by custom components, or by user code that needs to retrieve resources.

Figure 2:
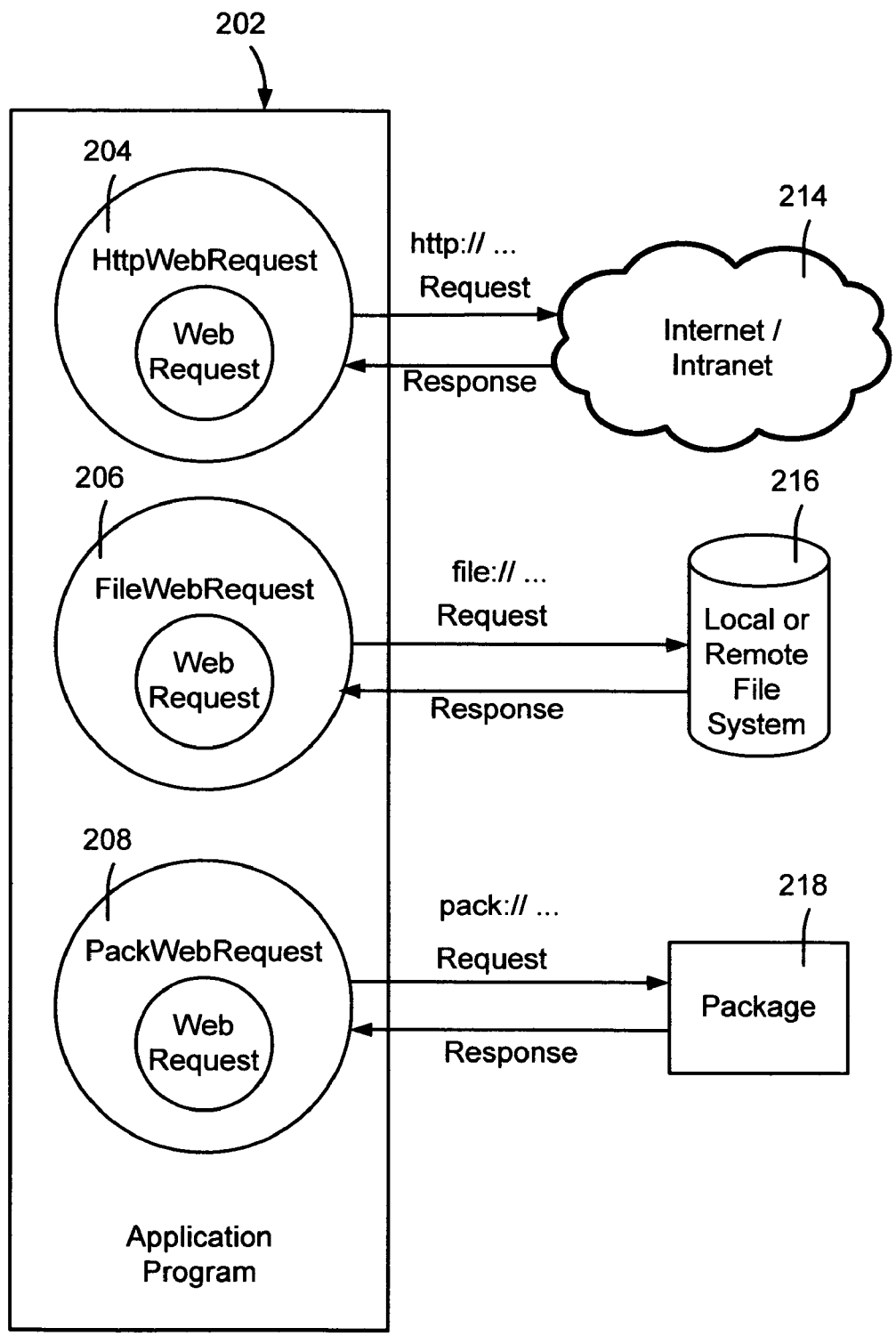
FIG. 2 is a block diagram representation of various schemes used by a software program to obtain resources.

FIG. 2 exemplifies resource retrieval by an example application program 202 using various Windows® Presentation Foundation-based retrieval mechanisms 204, 206 and 208 for various schemes, including an http:// scheme (corresponding to an HttpWebRequest retrieval mechanism 204), a file:// scheme (corresponding to a FileWebRequest retrieval mechanism 206) and a pack:// scheme (corresponding to a PackWebRequest retrieval mechanism 208). In one embodiment, these retrieval mechanisms 204, 206 and 208 are implemented as objects with APIs (e.g., derived from WebRequest) for the request/response schemes for obtaining resources, including from an Internet or intranet site 214, from a local or remote file system 216, and from a package 218, respectively. To this end, in one implementation, the program 202 specifies a valid URI (uniform resource identifier), and based on that URI, an appropriate retrieval mechanism responds to requests related to that resource.

As seen in the example of FIG. 2, (and as also described in U.S. patent application Ser. No. 11/111,735 filed Apr. 22, 2005, assigned to the assignee of the present application and hereby incorporated by reference), the retrieval mechanism 208 (PackWebRequest) thus provides one or more APIs for dealing with packages such as the package 218, including at runtime; note that there is also a retrieval mechanism 208 for providing a URI format to refer to individual streams within a package. In this manner, for example, a document (e.g., corresponding to a stream) contained within another document (e.g., a compound document corresponding to a package) may be referenced and obtained via the stream without having to obtain the entire document object.

By way of example, with any URI, (including one formatted according to the "pack://" URI scheme defined by XPS), the following example code may be used to retrieve a stream:

```
Uri sourceUri = new Uri("pack://application:,,,/page1.xaml");
WebRequest request = WebRequest.Create(sourceUri);
WebResponse response = request.GetResponse( );
Stream responseStream = response.GetResponseStream( );
```

In general, the first line of code identifies the resource location, which in this example is in a package as identified by the "pack://" URI scheme. The second line invokes a method (WebRequest.Create) to request (via sourceUri, a strongly typed identifier) the resource at that location by calling the method to create an appropriate object. The third line obtains the response object via a "request.GetResponse" method, and the fourth obtains a particular stream in that object via a response.GetResponseStream( ) method.

Note that although various resources may be located at various locations, via web requests, the only difference from the calling program's perspective is to provide a different URI for each resource, which provides programmers with a very consistent programming model. Via the pack scheme, the authority comprises a valid URI that refers to a specific package, such as www.exampleauthority.com. Web requests provide a rich asynchronous communications mechanism, a synchronous communications mechanism and a security mechanism (e.g., including by permissions checks), useable in a consistent way, that is, without requiring the developer to write separate code for different schemes or authorities.

With respect to packages and streams, in one particular implementation, an XPS package comprises a class that derives from an abstract Package class, and it aggregates "parts" that derive from the abstract PackagePart class. The PackageParts are abstractions over the individual streams that are contained within the container, and can be queried for these streams directly. In other words, a package is a collection of parts which know how to get and return streams, e.g., when accessed via the code described above. Central APIs for retrieving parts from these packages are subclasses of System.Net.WebRequest and System.Net.WebResponse (PackWebRequest 208 and PackWebResponse). These WebRequest derivatives retrieve resources for the pack:// scheme.

Certain other resources that an application program may wish to load are application-related resources. Application-related resources may be embedded in the application program, may be distributed as loose "content" files with the application program, may be located on the same site from which the application program was deployed, or may be embedded within another assembly (corresponding to another application program). Examples of such resources include image files and BAML files (Binary Application Markup Language, essentially compiled XAML files).

To obtain these resources, one embodiment of the technology described herein uses XPS packaging for application programs, by extending package and part concepts to include such application-related resources. For example, the above example code may be used seamlessly to obtain application-related resources. Notwithstanding, a different type of web request, e.g., using an application:// scheme or the like may be used.

Figure 3:
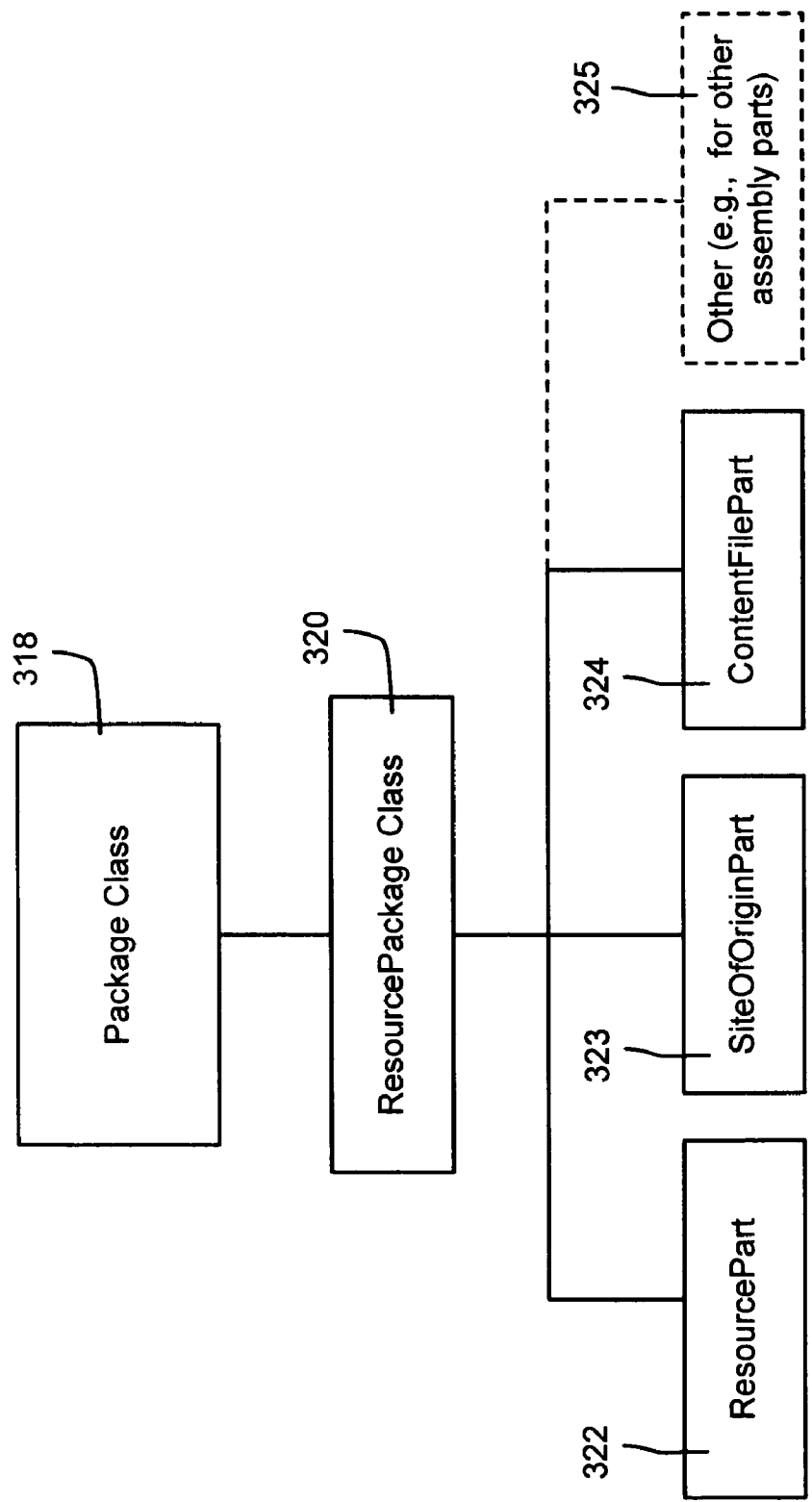
FIG. 3 is a conceptual representation of classes including derivatives called by an application program to obtain packaged application-related resources.

To leverage the XPS packaging pack:// scheme, as represented in FIG. 3, there is provided the concept of a resource package object 320 (ResourcePackage), which derives from Package class 318, and several derivatives of PackagePart. These derivatives include ResourcePart 322, SiteOfOriginPart 323, and ContentFilePart 324; these derivatives of PackagePart can get resources embedded in the application program, from the application's site of origin, and distributed as loose files with the application, respectively. Also shown in FIG. 3 is an optional other derivative, e.g., for resources embedded within another assembly, although it is feasible that ResourcePart 322 can obtain such other assembly resources.

Note that the implementation for each part need not be complex. For example, the ContentFilePart 324 may simply retrieve the correct stream using well known file system I/O operations to retrieve it from a specified location. ContentFilePart's value lies in providing a consistent abstraction over where the stream resides, and/or how to obtain it.

In one example implementation, to use pack:// URIs to obtain application resources, the internal base URI of an application, regardless of where it actually exists is defined as "pack://application:,,,/"; (this is the "application" scheme). With the infrastructure described above, developers can use absolute URIs, e.g., "pack://application:,,,/pages/page1.xam1" to refer to application resources. Note that one application may obtain the resources of another application in a similar manner (provided permissions are appropriate), e.g., "pack://application:,,,,/component;app2.exe/xyz.jpg."

In this manner, the PackWebRequest and PackWebResponse APIs may be used to request and receive these resources. Because the ResourcePackage 320 and the various derivatives of PackagePart (e.g., 322-325) provide an abstraction layer over where these streams are located and how they are obtained, the developer need not know this, but instead only needs a URI. Using WebRequest and WebResponse has the added benefit of familiarity and consistency with the manner in which developers get resources from network locations, as developers simply use an absolute URI corresponding to resource.

Figure 4:
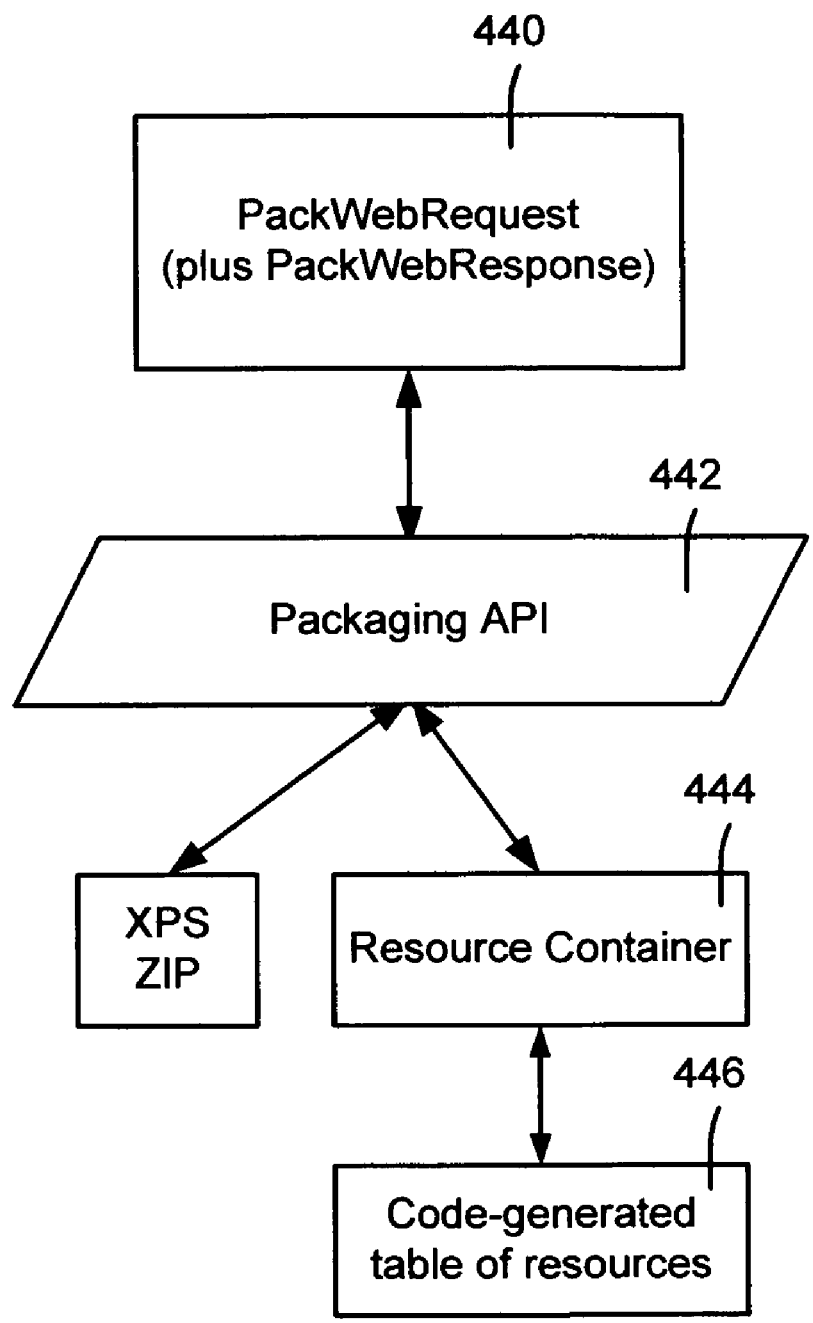
FIG. 4 is a conceptual representation of a packaging scheme that used by an application program to obtain packaged resources.
Figure 5:
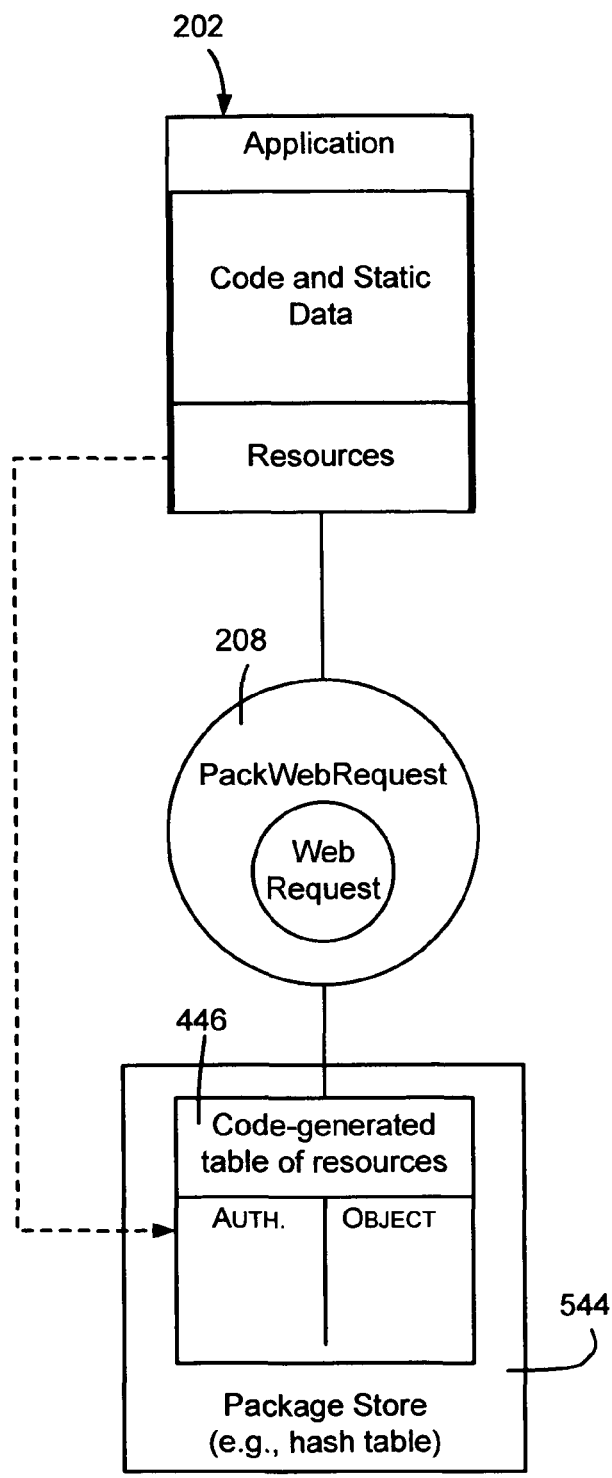
FIG. 5 is a representation of how an application references a packaged resource for retrieval.

As represented in FIG. 4, a pack web request/response 440 to the packaging API 442 essentially can be considered as filling a container object or the like 444 that contains parts that refer to the locations of the resources referenced by the application, e.g., in a resource table 446. The application 202 registers with the container 444, which as represented in FIG. 5, for packages can be considered a package store 544. Note that the package store 544 is generally per process, and may contain one entry per authority, e.g., a hash table keyed off of the authority. Also, note that an application may reference the resources of another application, provided that the security policy allows it.

In addition to using absolute URIs, developers may also to refer to resources using relative paths, e.g., "pages/page1.xam1". In other words, the system also enables developers to refer to application resources using relative URIs, rather than specifying the full path to the resource. This allows for better application portability and a more natural programming model.

To this end, one example resource loading system resolves this relative "pages/page1.xam1" URI to an absolute URI, e.g., "pack://application:,,,/pages/page1.xam1". The ability to use relative URIs is a convenience to developers, and its existence means that most developers never need to know about the pack:// scheme.

The resource loading infrastructure further enables Windows® Presentation Foundation to include a number of controls that can download their own content; e.g., controls such as Frame, Image, XMLDataProvider and so forth. Developers may also use the same model that Windows® Presentation Foundation uses to implement their own custom controls.

The Image element, for example, has a Source property which developers may use to specify from where the image should be retrieved. For example, a developer might author the following XAML to specify an image:

<Image Source="image1.jpg"/>

To implement the Image control, there is no custom logic required for determining the location of the Image or retrieving the stream. The implementation of Image uses infrastructure provided by the resource-loading system to resolve the relative URI and get the appropriate stream. For example, the same general code exemplified above may be used with a different URI:

```
Uri sourceUri = new Uri(http://www.example.com/img/a.png");
WebRequest request = WebRequest.Create(sourceUri);
WebResponse response = request.GetResponse( );
Stream responseStream = response.GetResponseStream( );
```

After the stream has been retrieved, the Image control may then decode the bits in the stream to generate a representation of the image which can be eventually rendered to the screen. Developers can implement their own custom controls using the same scheme.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   providing a mechanism that receives requests for application-related resources and other resources via a common interface and method, in which the resource is identified by a parameter value that includes a scheme and an authority;
   selecting a selected subcomponent of the mechanism from among a plurality of subcomponents based on the scheme, wherein the application-related resources correspond to a packaging scheme, and wherein selecting the selected subcomponent comprises differentiating the packaging scheme from at least one other scheme; and
   invoking the selected subcomponent to load at least part of an application-related resource based on the authority, wherein invoking the selected subcomponent to load the resource comprises making a determination as to whether the application-related resource comprises: a resource embedded in an application program, at least one content file associated with the application program, or a resource located on a site from which the application program was deployed.

2. The method of claim 1 wherein selecting the selected subcomponent comprises differentiating the packaging scheme from an internet/intranet scheme and from a file scheme.

3. The method of claim 1 further comprising, invoking a resource part component to load at least part of the resource when the determination is that the application-related resource comprises a resource embedded in the application program, invoking a content file part component to load at least part of the resource when the determination is that the application-related resource comprises at least one content file associated with the application program, or invoking a site of origin file part component to load at least part of the resource when the determination is that the application-related resource comprises a resource located on a site from which the application program was deployed.

4. The method of claim 1 wherein the application-related resource corresponds to a compound document, and further comprising, calling the mechanism to load a selected stream from among a plurality of streams associated with the compound document.

5. The method of claim 1 wherein the scheme and authority correspond to an absolute uniform resource identifier, and further comprising, receiving a relative path provided by an application program calling the mechanism, and converting the relative path to the absolute uniform resource identifier based on information associated with the application program.

6. A computing system comprising:
   a processor; and
   one or more storage medium storing computer-executable instructions which, when executed by the processor, implement a method comprising:
   providing a mechanism that receives requests for application-related resources and other resources via a common interface and method, in which the resource is identified by a parameter value that includes a scheme and an authority;
   selecting a selected subcomponent of the mechanism from among a plurality of subcomponents based on the scheme; wherein the application-related resources correspond to a packaging scheme, and wherein selecting the selected subcomponent comprises differentiating the packaging scheme from at least one other scheme; and
   invoking the selected subcomponent to load at least part of an application-related resource based on the authority, wherein invoking the selected subcomponent to load the resource comprises making a determination as to whether the application-related resource comprises: a resource embedded in an application program, at least one content file associated with the application program, or a resource located on a site from which the application program was deployed.

7. A storage device storing computer-executable instructions which, when executed by a processor, implement a method comprising:
   providing a mechanism that receives requests for application-related resources and other resources via a common interface and method, in which the resource is identified by a parameter value that includes a scheme and an authority;
   selecting a selected subcomponent of the mechanism from among a plurality of subcomponents based on the scheme; wherein the application-related resources correspond to a packaging scheme, and wherein selecting the selected subcomponent comprises differentiating the packaging scheme from at least one other scheme; and
   invoking the selected subcomponent to load at least part of an application-related resource based on the authority, wherein invoking the selected subcomponent to load the resource comprises making a determination as to whether the application-related resource comprises: a resource embedded in an application program, at least one content file associated with the application program, or a resource located on a site from which the application program was deployed.

* * * * *